United States Patent [19]

Smith et al.

[11] Patent Number: 5,086,360
[45] Date of Patent: Feb. 4, 1992

[54] CONSTANT FLYING HEIGHT SLIDER

[75] Inventors: Paul W. Smith, Agoura Hills, Calif.; Raymond S. Abbott, Elkhorn, Nebr.; Peter C. Lorince, Bellevue, Nebr.; Robert K. Wood, Elkhorn, Nebr.; Robert R. Lichtenberg, Elkhorn, Nebr.; John J. Gaukel, Omaha, Nebr.

[73] Assignee: Applied Magnetics Corporation, Goleta, Calif.

[21] Appl. No.: 579,058

[22] Filed: Sep. 6, 1990

[51] Int. Cl.$^5$ ............................................. G11B 5/60
[52] U.S. Cl. ..................................... 360/103; 360/104
[58] Field of Search ........................ 360/103, 104, 102

[56] References Cited

U.S. PATENT DOCUMENTS

| | | |
|---|---|---|
| 3,398,870 | 8/1968 | Mullan et al. |
| 3,543,396 | 12/1970 | Zbigniew et al. |
| 4,127,884 | 11/1978 | Nouchi et al. |
| 4,130,847 | 12/1978 | Head et al. |
| 4,217,613 | 8/1980 | Schwartz |
| 4,285,019 | 8/1981 | Scott et al. |
| 4,476,509 | 10/1984 | Konishi et al. |
| 4,490,760 | 12/1984 | Kaminaka et al. |
| 4,549,238 | 10/1985 | Ertingshausen et al. |
| 4,550,353 | 10/1985 | Hirai et al. |
| 4,553,189 | 11/1985 | Ogishima |
| 4,555,739 | 11/1985 | Le Van et al. |
| 4,559,572 | 12/1985 | Kumaska et al. |
| 4,636,894 | 1/1987 | Mo |
| 4,644,641 | 2/1987 | Verdone ........................ 360/103 |
| 4,646,180 | 2/1987 | Ohtsubo |
| 4,672,494 | 6/1987 | Furuya et al. |
| 4,673,996 | 6/1987 | White |
| 4,675,988 | 6/1987 | Matsuzawa |
| 4,695,512 | 9/1987 | Hatanai et al. |
| 4,700,248 | 10/1987 | Coughlin et al. |
| 4,704,788 | 11/1987 | Eckstein |
| 4,738,021 | 4/1988 | McClure |
| 4,751,779 | 6/1988 | Nagatomo et al. |
| 4,755,899 | 7/1988 | Kobayashi et al. |
| 4,757,402 | 7/1988 | Mo |
| 4,788,611 | 11/1988 | Kobayashi et al. |
| 4,796,127 | 1/1989 | Wada et al. |
| 4,802,042 | 1/1989 | Strom |
| 4,811,146 | 3/1989 | Niwa |
| 4,811,148 | 3/1989 | Aoki et al. |
| 4,841,624 | 6/1989 | Togawa et al. |
| 4,870,519 | 9/1989 | White ............................ 360/103 |

FOREIGN PATENT DOCUMENTS

| | | |
|---|---|---|
| 0237752 | 9/1917 | European Pat. Off. |
| 548514 | 1/1979 | Japan |
| 55-105858 | 8/1980 | Japan ............................ 360/103 |
| 55-139625 | 10/1980 | Japan |
| 59-186170 | 10/1984 | Japan |
| 59-186171 | 10/1984 | Japan |
| 59-186172 | 10/1984 | Japan |
| 59-227065 | 12/1984 | Japan |
| 62-114177 | 5/1987 | Japan |
| 62-164204 | 7/1987 | Japan |
| 63-136370 | 6/1988 | Japan ............................ 360/103 |
| 63-200314 | 8/1988 | Japan |

OTHER PUBLICATIONS

Clifford et al., "An Air Bearing Minimizing the Effects of Slider Skew Angle", Digests of the Intermag Conference, Mar. 28-31, 1989.

Primary Examiner—Aristotelis Psitos
Assistant Examiner—Alfonso Garcia
Attorney, Agent, or Firm—Knobbe, Martens, Olson & Bear

[57] ABSTRACT

The surface of a slider for a magnetic recording head, a burnishing head, or a glide head includes a pair of rails that, in operation, face the magnetic recording medium to form air bearing surfaces. These air bearing surfaces have slots cut into them at the same prescribed angle relative to the longitudinal axis of the slider, and along a single straight line. This provides slots which are asymmetric about the longitudinal axis, causing the slider to fly nearer the recording medium and at almost constant height.

7 Claims, 1 Drawing Sheet

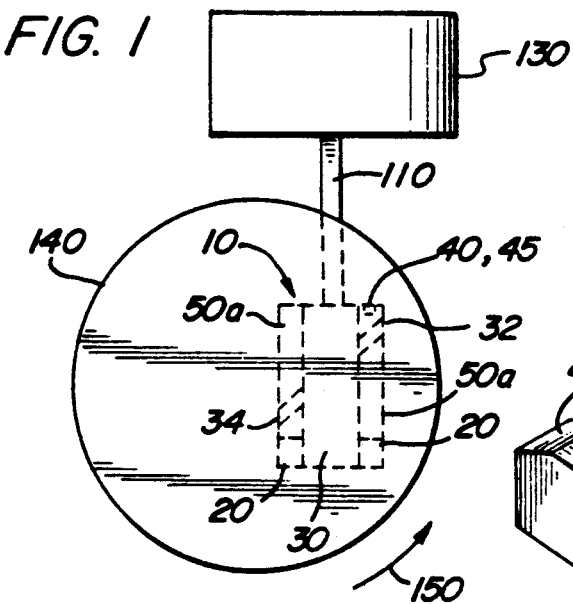
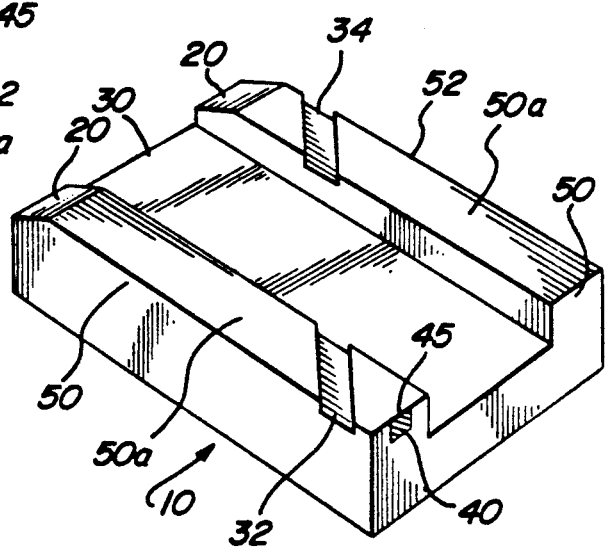
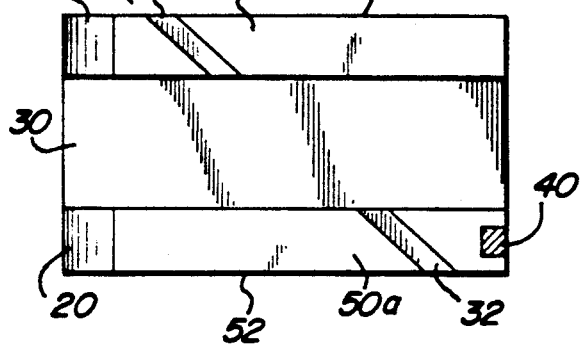
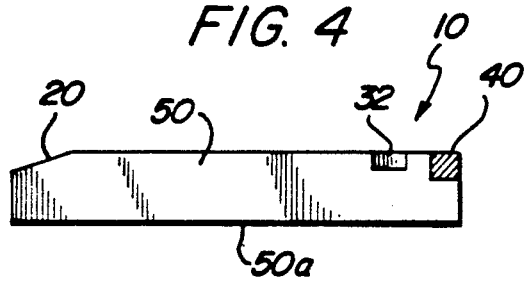
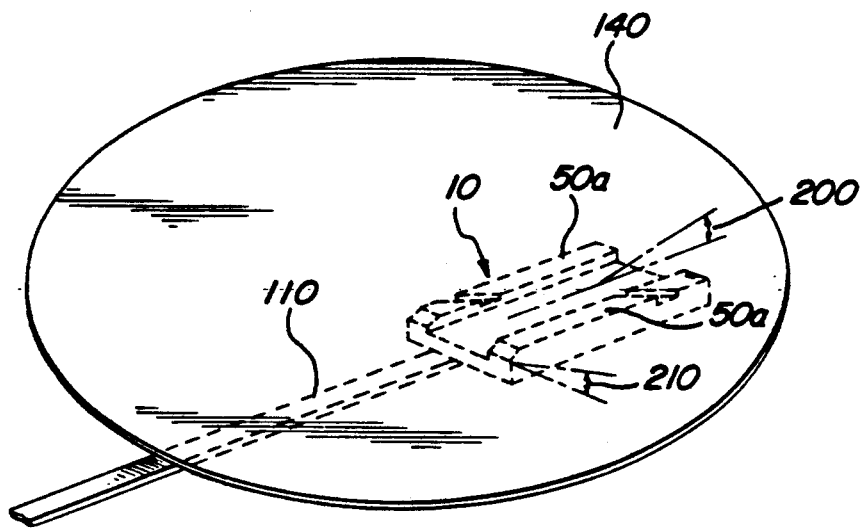

CONSTANT FLYING HEIGHT SLIDER

FIELD OF THE INVENTION

The present invention relates to magnetic recording mechanisms. More specifically, the present invention relates to heads used to burnish, test, and read and write information to magnetic recording media. More particularly, the present invention relates to heads that fly above a disk at relatively constant height regardless of head position with respect to the disk.

BACKROUND OF THE INVENTION

Flying heads include burnishing heads, glide heads, and magnetic recording heads. A flying head comprises a slider which is in the form of a small and extremely lightweight body which "flies" above the surface of a magnetic recording medium on an air cushion and, generally, a transducer for transmitting information. The recording medium is typically a disk, mounted such that it rotates with respect to the slider body. The three different types of heads have different functions with respect to the disk. Magnetic recording heads are used for recording information onto and reading information from a magnetic disk. Magnetic disks are prepared prior to this with burnishing heads, which smooth the surface of the disk. Then glide heads test if the disk is actually smooth using a piezo-electric crystal mounted at the rear which, when agitated, transmits an electronic signal. These are typically combined into a single burnish and glide head.

Burnish and glide heads fly over the disk at a precise altitude to verify that there are no points in the material of the disk that are higher than an established elevation. If high points are encountered, the head will contact these points, thereby agitating the piezo-electric crystal which then transmits the location of the crest. Hopefully, the contact between the head and the crest will jar the protrusion from the disk. Several passes over the disk are made until each protrusion is removed and no signal is transmitted by the piezo-electric crystal, thereby indicating the absence of high points on the disk. In this fashion burnish and glide heads smooth the surface of the disk. This process is completed before the magnetic recording head is installed in the drive.

Magnetic recording heads write data to the disk, read data from the disk, and erase data from the disk. They carry a transducer for this purpose, mounted on or integral with the rear of the slider. Generally, position of the transducer is extremely important, as will be discussed hereinafter in the detailed description of the invention. Data, in the form of magnetic flux reversals, is transmitted from magnetic recording heads. This type of data is not transmitted by burnish and glide heads. However, the principles of flight on an air cushion above the disk are the same for burnish and glide heads and magnetic recording heads. Sliders for either type of head may be formed from any composition of material, including single crystal or polycrystalline ferrite, calcium titanate, or aluminum oxide titanium carbide. Burnish and glide heads are typically made of aluminum oxide titanium carbide.

The flying head is typically supported by a load arm, which in turn is connected to an actuator. The actuator may be linear, moving the slider radially, or rotary, moving the slider along an arc from the outer to the inner diameter of the disk or vice-versa. The arc made by the rotary actuator across a disk will vary depending on disk size. Current drives primarily use rotary actuators for head positioning. An actuator may also have the capacity to hold a plurality of load arm and slider apparatuses both above and below a plurality of disks. The disk has different tracks, or concentric circles, where information is stored, over which the magnetic head is placed to read, write, or erase data. The principles of operation are the same for flying heads whether the slider flies above or below the disk.

Typical sliders have a ridge or rail running the length of each longitudinal edge. The surface of each rail that, in operation, faces the magnetic recording medium is called the air bearing surface. Before operation begins, the slider rests lightly against the disk, supported by a small amount of force from the load arm. During operation, the disk rotates at a specified speed forcing air between itself and the slider. This causes pressurization of the air beneath the air bearing surfaces, and, consequently, the slider lifts off and flies above the disk on a cushion of pressurized air.

The air cushion is required to be infinitesimally thin, on the order of five micro-inches for accurate high density recording, to allow the transducer to fly close to the recording medium at a constant height. The transducer with its integral gap transmits magnetic flux reversals which comprise data. Thus, the slider carrying the transducer and its transmitting gap must fly close to the recording medium at constant height. This necessitates the use of the burnish and glide head to smooth the disk. The burnish and glide head helps level the disk, producing a uniform path over which the magnetic recording head's slider can fly without encountering any protrusions that might cause catastrophic head crash. Thus, the burnish and glide head must fly at constant height as close to the disk as possible to insure a smooth surface. The smoother the disk surface, the closer the magnetic recording head can be to the recording medium. The smaller the flying height, or the distance between the magnetic recording head and the recording medium, the more precisely the effect on the disk of the transmitted magnetic flux reversals can be controlled.

The flying height, or the distance between the slider and the disk, tends to correspond to the velocity of disk rotation. At higher velocities, the distribution of pressure under the slider causes more lift than at lower velocities. A point on the inner diameter of the disk rotates more slowly than a point along the same radial line on the outer diameter. Thus, the slider will tend to fly lower near the inner diameter and higher near the outer diameter. It is critical that the slider's flight be controlled so that it flies close to the disk at as constant a height as possible to ensure dense and accurate data transfer, yet far enough away from the disk to avoid a catastrophic head crash. In other words, with the slider very close to the disk, the flight envelope, or range of slider flying heights, must be made as small as possible.

Among factors other than disk velocity influencing the flying height are the roll angle and the skew angle. The roll angle is the angle between the disk facing surface of the slider and the disk. In theory, this angle should be zero, however, in practice, it is not. Roll angle is a consequence of the greater velocity under the outer rail than the inner rail. As discussed previously, a point nearer the outer circumference of the disk rotates more quickly than a radially connected point near the inner circumference. Greater velocity corresponds to higher flying height. Thus, the outer rail tends to fly at a slightly greater distance from the disk than the inner rail, producing roll angle. This is undesirable if the outer rail carries the transducer since the transducer must be as close as possible to the disk at constant height for accurate data transmission.

The skew angle is the angle between the longitudinal axis of the slider and the disk's tangential velocity under the slider. Once the slider is mounted, its position with respect to the load beam cannot be changed. The arching motion of the rotary actuator changes, the angular orientation of the slider with respect to the i.e., the primary, intstantaneous direction of trave o the disk relative o he slider. In other words, he arching motion changes the skew angle. The skew angle can vary as much as 30 degrees, depending on radial position of the slider and what type of drive geometry is used.

Skew angle induces the leading edge, or the edge of the slider which flies into the air stream and is perpendicular to the longitudinal axis of the air bearing surface, to move closer to the disk. With zero skew, the slider flies straight into the air stream, allowing air to enter under the air bearing surface pressurized by the slider rail's front taper. With a skew angle bias, unpressurized air enters from the upstream side of each rail causing the slider to fly lower. The wide variation in skew angle causes the flying height to vary widely. Near the outer diameter of the disk, where skew angle is largest, skew may cause the flying height to become so small that catastrophic head crash occurs. The skew angle can be used to reduce flying height at the disk's outer perimeter if care is taken to insure that the slider will not contact the disk as it flies over each track. For this reason, small skew angles are the most desirable. Additionally, setting a particular skew at a given track may require undesirable changes to the drive geometry. A small inner diameter skew angle does not necessitate major changes in traditional drive geometry.

Recent attempts to achieve a small flight envelope close to the disk have focused on cutting patterns of grooves or slots into the rails. Generally, slots are cut in V-shapes such that one rail has a set of one or more parallel slashes and the opposite rail has corresponding slashes rotated 90 degrees from the first set, i.e., the slashes are symmetrical about the longitudinal axis o the slider. Other types of slotted sliders include those with V-shaped patterns cut into each rail. For each type, the V-shape is arranged such that the apex flies into the air stream. In this orientation, the V-shape has low drag, streamlining pressurized air away from the air bearing surfaces of the slider and allowing relatively constant flying height. However, since sliders are so small, cutting slots in different directions is difficult work. Precaution must be taken to insure that when cutting the second set of slots orthogonal to the first set, the first set of slots is not damaged. Etching techniques may be used to implement the slots, but this too is a tedious process. The success found in flying height stability is offset by the difficulty and high cost involved in manufacturing such sliders.

Additionally, contouring the edges of the rails has been attempted. This, too, has resulted in more uniform flying height than typical sliders. Again however, the manufacture of such contoured pieces is quite difficult.

SUMMARY OF THE INVENTION

The present invention is a slotted slider for use in a flying head. Its base is of traditional form, having a rail along each edge parallel to the longitudinal axis of the slider. Each rail has a ramp at its leading edge. These rails define the air bearing surfaces that maintain pressurization and allow the slider to fly adjacent the recording medium. A single slot is cut across each rail at a prescribed angle and width such that the slots lie along a straight line and are not symetrical about the lonigtudinal axis fo the slider. These slots enable the flying head to fly at a relatively constant height above the magnetic recording medium virtually undisturbed by radial position, skew angle, and roll angle. Manufacture is uncomplicated since both slots can be made with a single stroke of a cutting machine along a straight line. Thus, the integrity of each slot is not threatened when the other is cut.

BRIEF DESCRIPTION OF THE DRAWINGS

FIG. 1 is an illustration of the invention mounted below a disk in, a typical drive.

FIG. 2. is a perspective view of the preferred embodiment of the invention for mounting below the magnetic recording medium in a typical 3.5 inch drive.

FIG. 3 is a top view of the preferred embodiment of the invention.

FIG. 4 is a side view of the preferred embodiment of the invention.

FIG. 5 is an illustration of skew angle and roll angle.

DETAILED DESCRIPTION OF THE PREFERRED EMBODIMENT

In FIG. 1, the slider 10 is connected to a load arm 110, which is in turn connected to an actuator 130 which moves the load arm 110 and slider 10 apparatus to the correct sector and track of the disk 140 for reading, writing, and erasing. The load arm 110 provides a force on the slider 10 just strong enough to keep the slider 10 resting against the disk 130. During operation, the disk 130 rotates in the direction of the arrow 150 above the slider 10. A very thin film of air is created that moves along with the disk 130. This film is capable of providing forces sufficient to maintain an infinitesimal space between the recording head and the disk 130. Thus, the slider 10 flies below the disk 130 on this cushion of pressurized air. The principle of operation is the same when the slider is positioned above the disk 130.

FIG. 2 shows a perspective view of the preferred embodiment of the present invention for use in a typical 3.5 inch drive. The slotted slider 10 is 0.126 inches wide and 0.161 inches long. It has one rectangular rail 50 along each of the edges aligned parallel to a longitudinal axis of the slider. The top of each rail 50 is an air bearing surface 50a. The leading edge of each rail 50 has an upward slope, or ramp 20 across the entire width of the rail. The ramp is preferably flat, 0.015 inches in length, and angles upwardly from the air bearing surface at approximately a 50 minute angle. The rail is cut with a grinding operation such that the outer edges are stepped below the air bearing surface 50a to a depth of greater than 0.001 inches. The step 52 on each side is 0.004 inches wide and runs the length of the portion of the air bearing surfaces 50a that are not sloped. The slider is mounted such that the air bearing surfaces 50a face the magnetic recording medium, or disk. The rails, including both the sloped and non-sloped parts, are preferably flat and approximately 0.161 inches in length and 0.026 inches wide. There is a 0.161 inch long and 0.066 inch wide recessed channel 30 between the rails, also cut with a grinding operation to a depth greater than 0.001 inches.

A single slot 32, 34 is cut across each air bearing surface 50a such that the slots lie along a straight line and not symmetrica. Preferably, this line intersects both the longitudinal axis and a transverse line that lies midway along the portion of the air bearing surfaces that is not sloped. The preferred embodiment has approximately 0.04 inch wide slots 32, 34 cut to a depth greater than 0.001 inches but not exceeding the depth of the recessed area 30. The slot is oriented at approximately a +30 degree angle from the slider's longitudinal axis. A positive slot angle is defined such that after mounting, the slot in the outermost rail will be nearer the trailing edge, while the slot on the innermost rail will be nearer the leading edge. The dimensions given above have been found empirically to produce the smallest flying height envelope for the slotted slider 10 of FIG. 2 mounted below a disk rotating counter-clockwise or above a disk rotating clockwise in a typical 3.5 inch drive. One skilled in the art will realize that the slot must be rotated 90 degrees to mount the slider below a disk rotating clockwise or above a disk rotating counter-clockwise.

Of interest is the fact that the slots are not of typical aerodynamic V-shape. V-shaped slots are cut with two separate grinding operations that must be carefully controlled to insure that each grinding operation does not cut the wrong way into the other rail. V-shaped slots can also be etched, a difficult and more expensive process. The slots 32, 34 can be cut with a simple grinding operation. Moreover, since the slots lie along a straight line they can be cut with a single stroke, simplifying manufacture and reducing cost of these constant flying height sliders versus previously discussed slotted sliders with V-shaped slots.

The transducer 40, is mounted on or integral with the trailing edge of the air bearing surface in which the slot 32 is cut furthest from the leading edge; ie. the transducer 40 is placed in the rail where the slot 32 is closer to the transducer 40 than to the leading edge. For monolithic and composite heads, the transducer comprises a magnetic core wound with wire, inserted into the specified rail. Inserting the transducer 40 into the slider 10 reduces sensitivity of the magnetic head to external fields. For thin film heads, the transducer is chemically deposited on the specified rail such that it is integral with the slider. The slider is mounted such that the transducer 40 is outboard during operation. The gap 45 in the transducer is located on the disk-facing side of the slider, allowing data in the form of magnetic-flux reversals to be transmitted to the recording medium. To insure accurate, high-density data transmission, the gap 45 is kept at a constant height above the recording medium. This is accomplished by keeping the slider 10, which carries the transducer 40, at constant height above the recording medium.

The slots 32, 34 serve to change the pressure loading distribution on the air bearing surfaces 50a providing an enhanced flight profile. Most importantly, they bleed pressurized air from the air bearing surfaces 50a. In practice, they remove a region that would pressurize air had the slots not been cut. This reduces pressure loading in the local area of the slot, redistributing the pressure profile, and allowing the slider to fly at more constant height.

The total pressure under a given slider is constant, independent of the position of the actuator 130 (FIG. 1), ie. regardless of which disk track is adjacent the slider. It is the change in pressure distribution with respect to radial position that causes the slider to fly at different heights. A slotted slider with the same size rails as an unslotted slider will have less total pressure beneath its air bearing surfaces. Thus, a slotted slider permits wider rails, increasing the total pressure on the slotted slider without exceeding the amount of pressure on the unslotted slider. This allows a slotted slider with wider rails to be used in the same drive geometry as an unslotted slider without redesign of the load beam forces. Since the unwanted unpressurized air entering due to skew must cover more area, wider rails are less sensitive to skew angle. Skew angle 200, defined previously as the angle between the longitudinal axis of the slider and the disk's tangential velocity, i.e., the primary direction fo travel of the disk is illustrated in FIG. 5.

Additionally, the slots are cut at an angle designed to further desensitize the slider to the effects of the broad range of possible skew angles. The line upon which the slots are cut is perpendicular to the average direction of incoming unpressurized air due to skew angle. In this manner, the slots deflect some of the unpressurized air that enters under the air bearing surfaces 50a as a result of skew. This changes the pressure loading on the slider, allowing it to fly at more constant height closer to the disk.

The slots 32,34 are offset from one another along the longitudinal axis creating a pressure profile under the slider that also compensates for the effects of roll angle. Roll angle 210, defined previously as the angle between the disk facing surface of the slider and the disk 140 is also illustrated in FIG. 5. The outer air bearing surface flies higher than the inner air bearing surface due to a difference in velocity of teh disk relative to each air bearing surface. To counteract this, the offset slots make the outer rail geometrically different from the inner rail such that their non-uniformity compensates for the non-uniform velocities below each. There are many ways other than offset slots cut along a straight line to make the outer and inner rails non-uniform, but none are so easy as the method of this invention. With this method, slots can be cut in each rail without fear of damaging the other rail.

The slots serve to redistribute the pressurized air under the slider to compensate for many different problems, including skew angle, roll angle, and greater velocity with respect to greater track circumference. The new pressure distribution optimizes the flying profile such that the slider flies at relatively constant height very near the disk.

To further optimize the flying profile of the slider 10, including reducing both the flying height and the flight envelope, the slider is mounted on the load arm 110 such that there is a very small inner diameter skew angle of approximately +3 degrees. Positive skew angle is defined such that it moves the leading edge of the air bearing surfaces closer to the disk center. Such a small angle can readily be ignored without significantly impacting the flight profile. However, if used, the small skew will improve the slider's performance. Skew brings the leading edge of the slider closer to the disk. As the actuator moves the slider across the disk, the skew angle inherently changes. At each track the +3 degree inner diameter skew is altered such that the slider geometry compensates for the skew and the slider flies at nearly constant height. Since the skew angle is small, it does not introduce the necessity for drive redesign or the problem of increased risk of catastrophic head crash.

The above is a description of only one embodiment of the invention. One skilled in the art will realize that the above disclosed invention can be applied to many different types of sliders including not only magnetic recording head sliders as described above, but burnish and glide head sliders as well. One skilled in the art will additionally realize that other slider dimensions, slot orientations, slot widths, and slot locations along the slider rails can be used to effect the same outcome. This invention can be scaled such that the slots are a different width and at a different angle depending on the dimensions of the slider used and the drive geometry. Scaled versions of this type of offset slotted slider are presently under development for sliders 70%, 50%, 25%, and 10% the size of the preferred embodiment discussed above. Each different type and dimension of slider may be used in many different drive geometries, not confined to the one discussed for the above disclosed slotted slider. One skilled in the art will further realize that this type of slotted slider can be manufactured in different ways than with a simple, one-step grinding process. Manufacture can be less conveniently accomplished using an etching process, or the sliders can be molded as a solid piece with an integral slot. With molding the slider can be manufactured having offset slots perpendicular to the longitudinal axis, satisfying the condition that the air bearings be non-uniform while still insuring that the process by which each slot is made does not affect the other. Thus, there are a variety of sliders, slider sizes, slot sizes and orientations, and methods of manufacture that will employ the present invention.

What is claimed is:

1. A device for positioning a transducer in an airstream near a magnetic recording medium moving with a primary direction of motion, said device comprising:
   a generally rectangular slider housing said transducer, said slider having four sides arranged at approximately 90 degree angles such that a first pair of said sides are located opposite each other and a second pair of said sides are located opposite each other, a longitudinal axis intersecting said first pair of sides, and a transverse axis intersecting said second pair of sides, one of said first pair of sides intersected by said longitudinal axis being a leading edge, said leading edge arranged to contact said airstream first, and the other of said first pair of sides intrsected by said longitudinal axis being a trailing edge;
   a rail running along each side edge from said leading edge to said trailing edge, each rail having an air bearing surface which faces the magnetic recording medium, said longitudinal axis being located midway between said air bearing surfaces, each air bearing surface having a sloped ramp at said leading edge, said ramp defining a sloped portion of said air bearing surface and a non-sloped portion of said air bearing surface, said non-sloped portion of said air bearing surface being generally flat relative to a plane defined by said side edges, said transverse axis being located midway along said non-sloped portion of said air bearing surfaces; and
   a slot in each air bearing surface, said slots being cut along a single straight line at an identical acute angle from said longitudinal axis whereby the pressure under said air bearing sufaces is reduced and said slider flies at approximately constant height over said magnetic recording medium, whereby pressure is relieved from a location in one of said air bearing surfaces but is not relieved from a symmetrical location in the other of said air bearing surfaces.

2. The apparatus of claim 1, wherein said angle is approximately 30 degrees and the width of said slot is aproximately 0.04 inches.

3. The apparatus of claim 2, wherein said straight line upon which said slots are cut intersects with both the longitudinal axis and said transverse axis.

4. The apparatus of claim 1, wherein each of said ramps is flat, 0.015 inches long, and tapered at approximately a 50 minute angle relative said non-sloped portion of said air bearing surface.

5. The apparatus of claim 4, wherein said slider is approximately 0.161 inches long and 0.126 inches wide, and wherein said non-sloped portion of each of said air bearing surfaces is 0.026 inches wide and 0.146 inches long.

6. The apparatus of claim 1, wherein said slider is positioned such that a skew angle between said longitudinal axis and said primary direction of motion of the disk rotating with respect to said slider is approximately 3 degrees.

7. A slider wich flies adjacent a recording surface, said slider having a longitudinal axis, comprising:
   a first air bearing surface aligned generally parallel to said longitudinal axis;
   a second air bearing surface aligned generally parallel to said longitudinal axis;
   a channel between said first and second air bearing surfaces, said channel being at least 0.001 inches in depth;
   at least one slot in said first air bearing surface formed along a line which intersects said longitudinal axis at an oblique angle from said longitudinal axis;
   at least one slot in said second air bearing surface formed along said line whch intersects said longitudinal axis at said oblique angle, said first and second slots being at least 0.001 inches in depth, whereby pressure is relieved from a location in said first air bearing surface but is not relieved from a symmetrical location in said second air bearing surface.

* * * * *

UNITED STATES PATENT AND TRADEMARK OFFICE
CERTIFICATE OF CORRECTION

PATENT NO. : 5,086,360

DATED : February 4, 1992

INVENTOR(S) : Smith, et al.

It is certified that error appears in the above-identified patent and that said Letters Patent is hereby corrected as shown below:

Claim 1, Column 7, Line 49, please replace "sides intrsected" with --sides intersected--;

Signed and Sealed this

Second Day of December, 1997

*Attest:*

BRUCE LEHMAN

*Attesting Officer*   *Commissioner of Patents and Trademarks*